J. H. PATTEN.
METHOD OF MAKING AUTOMOBILE TIRES.
APPLICATION FILED MAR. 5, 1920.
1,380,736.
Patented June 7, 1921.
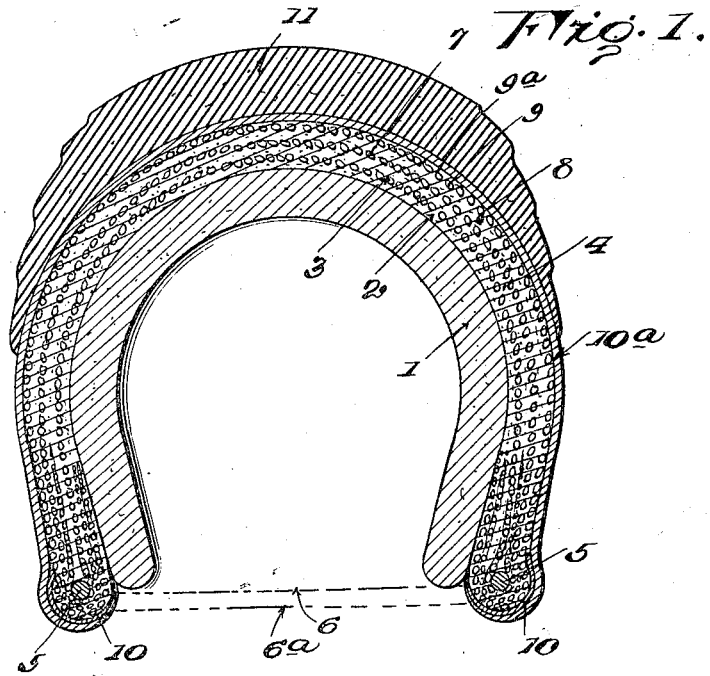
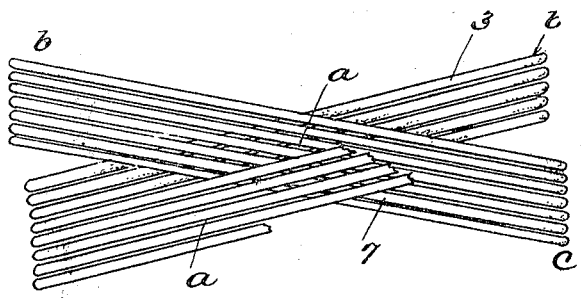
Inventor.
J. H. Patten.
by Fred P. Gorin
Atty.

UNITED STATES PATENT OFFICE.

JOHN H. PATTEN, OF KENT, WASHINGTON, ASSIGNOR TO W. T. BEHME, OF KING COUNTY, WASHINGTON.

METHOD OF MAKING AUTOMOBILE-TIRES.

1,380,736.  Specification of Letters Patent.  Patented June 7, 1921.

Application filed March 5, 1920. Serial No. 363,424.

*To all whom it may concern:*

Be it known that I, JOHN H. PATTEN, a citizen of the United States, and residing at Kent, in the county of King and State of Washington, have invented certain new and useful Improvements in Methods of Making Automobile-Tires, of which the following is a specification.

This invention relates to automobile tires.

An object of the invention is to provide a cord tire of durable construction, particularly the side walls which are subjected to great strains when turning curves, making short stops and the like.

The invention also comprehends improvements in the method of making the tire, which will be hereinafter more particularly pointed out in the specification and claim.

In the drawings:

Figure 1 shows a sectional view of the tire on a form.

Fig. 2 shows a plan view of the cord layers in their relative positions.

1 indicates the form on which the tire is formed which is of usual construction. A layer of rubber 2 is first applied to the form, then a layer of cord 3 is wound biasly around the form over the layer of rubber, and a layer of cushion gum 4 is applied over the cord layer. Beads 5 are then placed near the inner edges of the form and the cord layer is cut as indicated at 6, the ends being turned outwardly and back against the side wall of the tire to hold the beads. These ends are held by a thin coating of gum.

Another layer of cord 7 is wrapped around the periphery of the tire and over the layer of gum 4 at an angle with the previous layer and covered with a coating of cushion gum 8. Another wrapping of cord 9 is wound biasly on the tire at an angle with the layer 7. The layers 7 and 9 are cut as indicated at 6ª and bent inwardly around the beads and against the inner portions of the side walls and a thin coating of rubber applied to hold the ends fast. The chafing strip 10 is next applied and secured tightly around the inner edges of the tire, which is then covered with a layer of cushion gum 9ª.

A covering 10ª is now applied over the last layer 9ª so that the edges extend to the inner edges of the tire as shown in Fig. 1. This last covering 10ª is preferably of a different constituency and finishes the side walls of the tire, the tread 11 being applied over the covering 10ª and the whole tire finally vulcanized to firmly unite the several layers.

The cord layers being wound biasly and at a small angle with the transverse plane of the tire as shown in Fig. 2 and having the ends wound around the beads as shown, forms a construction which will withstand the heavy strains when starting, stopping or turning corners. In starting and stopping, the portion at *a*, Fig. 2 which is over the tread portion engaging with the ground receives the initial strain and exerts a force on the portions of the cords between *a* and *b* or *a* and *c*, depending upon the direction of movement of the tire. This force pulls on the ends around the beads, the ends of the outer layer locking the ends of the inner layer against the bead and preventing them from being pulled loose, and the angle of the cords gives the proper position so that they have their maximum holding power.

What I claim is:

A method of making a cord tire consisting in coating a form with a layer of resilient material winding a layer of cord biasly over the resilient material, applying a coat of cushion gum over the cord layer, applying beads, severing the cord layer on the inner periphery between the beads, bending the ends outwardly around the beads and against the side walls of the tire, winding a second layer of cord around the periphery of the construction thus made, applying layer of cushion gum over the said periphery wrapping, applying another wrapping of cord, biasly around the tire, severing the ends and bending the ends inwardly around the beads and against the inner portions of the side walls, applying chafing strips around the bead portions, coating the tire with a layer of cushion gum, over the last cord layer, coating the tire with a layer of resilient material, over the last mentioned cushion gum layer and the chafing strips, and applying a layer of resilient material over the last mentioned layer to form the tread.

In testimony whereof I affix my signature in the presence of two witnesses.

JOHN H. PATTEN.

Witnesses:
 SUZANNE V. McLAUGHLIN,
 OSCAR J. HANSON.